(12) United States Patent
Choi et al.

(10) Patent No.: US 8,714,746 B2
(45) Date of Patent: May 6, 2014

(54) MULTI-PROJECTION SYSTEM

(71) Applicant: CJ CGV Co., Ltd., Seoul (KR)

(72) Inventors: Yoo Hwan Choi, Goyang-si (KR); In Jae Seong, Seoul (KR); Hwan Chul Kim, Seoul (KR); Su Ryeon Kang, Goyang-si (KR)

(73) Assignee: CJ CGV Co., Ltd., Seoul (KR)

( * ) Notice: Subject to any disclaimer, the term of this patent is extended or adjusted under 35 U.S.C. 154(b) by 0 days.

(21) Appl. No.: 13/667,364

(22) Filed: Nov. 2, 2012

(65) Prior Publication Data
US 2014/0016099 A1     Jan. 16, 2014

(30) Foreign Application Priority Data

Jul. 12, 2012 (KR) .................. 10-2012-0076100
Jul. 25, 2012 (KR) .................. 10-2012-0081376

(51) Int. Cl.
*G03B 21/26* (2006.01)
*G03B 37/04* (2006.01)

(52) U.S. Cl.
USPC .................. 353/30; 353/94; 352/70

(58) Field of Classification Search
USPC ........ 353/30, 31, 7, 121, 122, 94; 352/69, 70; 434/44
See application file for complete search history.

(56) References Cited

U.S. PATENT DOCUMENTS

| | | | |
|---|---|---|---|
| 5,130,794 A | 7/1992 | Ritchey | |
| 5,602,978 A * | 2/1997 | Lastinger | 345/419 |
| 6,034,717 A * | 3/2000 | Dentinger et al. | 348/51 |
| 6,065,854 A | 5/2000 | West et al. | |
| 6,176,584 B1 | 1/2001 | Best et al. | |
| 6,764,183 B2 * | 7/2004 | Okazaki | 353/31 |
| 2003/0006091 A1 * | 1/2003 | Golterman | 181/292 |
| 2003/0080968 A1 | 5/2003 | Niikawa et al. | |
| 2005/0128437 A1 * | 6/2005 | Pingali et al. | 353/69 |
| 2005/0248726 A1 | 11/2005 | Read et al. | |
| 2007/0121088 A1 * | 5/2007 | Liang et al. | 353/119 |
| 2008/0088807 A1 * | 4/2008 | Moon et al. | 353/121 |
| 2008/0095468 A1 * | 4/2008 | Klemmer et al. | 382/285 |
| 2009/0100767 A1 | 4/2009 | Kondo et al. | |

FOREIGN PATENT DOCUMENTS

| | | | |
|---|---|---|---|
| DE | 202010008442 U1 | 1/2011 | |
| EP | 0514045 A1 | 11/1992 | |
| EP | 1365584 A2 | 11/2003 | |
| FR | 2911966 A1 | 8/2008 | |

(Continued)

OTHER PUBLICATIONS

KIPO Notice of Allowance for Korean Patent Application No. 10-2012-0081376.

(Continued)

*Primary Examiner* — William C Dowling
*Assistant Examiner* — Ryan Howard
(74) *Attorney, Agent, or Firm* — LRK Patent Law Firm

(57) ABSTRACT

A multi-projection system having a plurality of projection surfaces onto which images are projected is provided, where the plurality of projection surfaces are disposed on two or more sides not parallel to each other. The multi-projection system provides high three-dimensional images and a high degree of immersion in images and further provides multi-view images, thereby making theater customers feel like they really exist in the space described through the images.

15 Claims, 4 Drawing Sheets

(56) References Cited

FOREIGN PATENT DOCUMENTS

| | | |
|---|---|---|
| JP | 3047820 B2 | 3/2000 |
| JP | 2000-122193 A | 4/2000 |
| JP | 2002-070211 A | 3/2002 |
| JP | 2007-147786 A | 6/2007 |
| WO | 2006/056797 A1 | 6/2006 |

OTHER PUBLICATIONS

International Search Report for International Application No. PCT/KR2013/000180 which corresponds to the above identified application.

European Search Report for European Application No. 13163160 which corresponds to the above identified U.S. application.

* cited by examiner

MULTI-PROJECTION SYSTEM

BACKGROUND OF THE INVENTION

1. Field of the Invention

The present invention relates to a projection system that projects and reproduces images, and more particularly, to a multi-projection system that has a plurality of projection surfaces three-dimensionally disposed therein to project images onto the three-dimensionally disposed projection surfaces, thereby providing the three-dimensional images to theater customers.

2. Background of the Related Art

So as to reproduce images like movies, advertisements, etc. in a theater, conventionally, two-dimensional images have been projected onto a flat screen disposed on the front side of the theater.

FIG. 1 shows an example wherein an image is reproduced in a conventional theater system, and in this case, the image is projected from a projector disposed at the rear side of a theater onto the screen disposed on the front side of the theater, so that only two-dimensional image is provided to the theater customers.

Recently, studies on the technology providing three-dimensional images to customers have been made, and as a result, the technology related to three-dimensional image such as 3D TVs, 3D theaters, and the like has been developed. The 3D image technology makes use of the principle wherein if different images are inputted to a customer's left and right eyes and are met in his brain, three-dimensional effects can be provided even from the flat screen. When images are photographed, two cameras having different polarization filters mounted thereon are adopted, and when the images are reproduced, eyeglasses on which a polarization filter is mounted are worn to input different images to the customer's left and right eyes.

Such 3D technology provides three-dimensional images to the theater customers, but they just see the images reproduced on the flat screen, thereby causing their immersion to the images to become low.

On the other hand, IMAX movies have been developed to provide a high degree of immersion to theater customers. The IMAX is an abbreviation of Eye Maximum, which means images are filled up to a human being's viewing limit (viewing angles). So as to display images lively, the screen is inclined by 5 degrees toward the customers, and 70 mm film is used having resolution higher by 10 times than existing 35 mm film. Accordingly, vivid and large-sized images are provided to allow the theater customers to be completely immerged to the images.

However, the conventional technology like the 3D technology or IMAX technology allowing the image immersion of the customers to be improved has a limit in that the screen has a two-dimensional plane. Accordingly, the degree of immersion of the customers in the images, that is, the three dimensional effect becomes lowered.

SUMMARY OF THE INVENTION

Accordingly, the present invention has been made in view of the above-mentioned problems occurring in the prior art, and it is an object of the present invention to provide a multi-projection system that is capable of reproducing images from a plurality of projection surfaces disposed three-dimensionally, thereby providing three-dimensional images to theater customers.

It is another object of the present invention to provide a multi-projection system that is capable of reproducing images by utilizing various surfaces in a theater such as front, left/right, and top/bottom sides, thereby improving a degree of immersion in the images.

It is still another object of the present invention to provide a multi-projection system that is capable of correcting images in accordance with the kinds of projection surfaces onto which the images are projected, so that even though the images are reproduced from different projection surfaces, a degree of immersion of theater customers in the images can be enhanced.

To accomplish the above objects, according to a first aspect of the present invention, there is provided a multi-projection system that has a plurality of projection surfaces disposed on two or more sides not parallel to each other, thereby allowing one image to be reproduced through the plurality of projection surfaces.

Preferably, the plurality of projection surfaces is disposed on the front, left and right sides, and further, the projection surfaces is disposed on one or more of top and bottom sides.

Preferably, the multi-projection system further includes a projector disposed on each projection surface to project the images.

Preferably, the number of projection surfaces disposed on certain side is provided plurally.

Preferably, each projection surface is formed of a screen or wall surface.

Preferably, the screen is made of PVC, white-coated PVC, pearl-coated PVC, or aluminum-coated PVC, and each wall surface includes a sound-absorbing material. Preferably, the sound-absorbing material includes any one of a porous sound-absorbing material, a vibrating sound-absorbing material, and a resonant sound-absorbing material. Further, each wall surface is coated with optical paint for light reflection.

Preferably, if the kinds of the plurality of projection surfaces are different from each other, the image projected onto each projection surface is corrected in accordance with the kind of each projection surface. The correction is performed in accordance with the colors of the projection surfaces, the materials of the projection surfaces, the shapes of the projection surfaces, the distances between the projection surfaces and the projectors caused by the positions of the projectors, or the image projection angles.

To accomplish the above objects, according to a second aspect of the present invention, there is provided a multi-projection system having display means adapted to reproduce images therefrom, the display means being disposed on two or more sides not parallel to each other and being formed of an LED or LCD.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Hereinafter, an explanation on a multi-projection system according to the preferred embodiments of the present invention will be in detail given with reference to the attached drawings.

Figure 2:
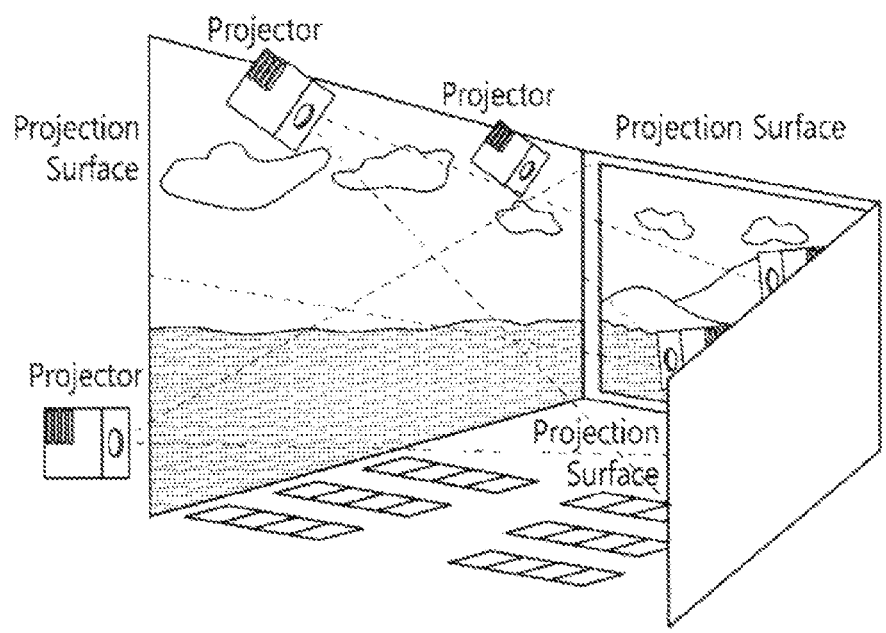
FIG. 2 is a perspective view showing a multi-projection system according to a first embodiment of the present invention.

FIG. 2 is a perspective view showing a multi-projection system according to a first embodiment of the present invention.

A multi-projection system according to a first embodiment of the present invention has a plurality of projection surfaces disposed on two or more sides not parallel to each other.

In conventional practices, images are projected only onto a screen disposed on the front side of a theater, and the images reproduced on the two-dimensional screen are provided to theater customers. Alternatively, 3D technology is applied to the images reproduced on a flat plane. According to the present invention, however, images are reproduced from the plurality of projection surfaces disposed three-dimensionally on two or more sides not parallel to each other, so that even though the 3D technology is not applied to the images, the images having high three-dimensional effects and immersion can be provided to the theater customers through the three-dimensionally disposed projection surfaces.

According to the present invention, the images are reproduced through the plurality of projection surfaces, which makes the theater customers feel like they exist within the space created through the images. As the images are reproduced in the space existing within the range of the customer's viewing angle, the three-dimensionally reproduced images can be provided lively to the theater customers.

That is, when compared with the conventional IMAX theater just having an enlarged screen size to improve the immersion in images, while still having a limitation of the two-dimensional plane, the multi-projection system according to the present invention provides the three-dimensional effects in completely different ways. According to the present invention, the images are reproduced from all sides capable of being visually recognized by the customers, that is, a front side, left and right sides, and top and bottom sides, which makes the customers feel like they are located in the space described by the images. Accordingly, the multi-projection system itself according to the present invention is recognized as a kind of virtual reality, thereby obtaining a high degree of immersion in the images when compared with the conventional technology.

According to the present invention, one image is dividedly projected onto each projection surface, and thus, the images reproduced from the plurality of projection surfaces are added and recognized as one image. Further, a main image is reproduced from the projection surface disposed on the front side, while images having special effects are being reproduced from the projection surfaces disposed on lateral sides, thereby providing the three-dimensional effects to the theater customers through the projection of the different images onto the plurality of projection surfaces.

According to the present invention, the angle between the projection surfaces is not limited to any specific angle and is freely varied only if the three-dimensional effects are provided to the theater customers. Further, the number of projection surfaces, the arrangement manner of the projection surfaces, and the angle between the projection surfaces are varied in accordance with the shape of the theater in which the multi-projection system of the present invention is installed, without having any limit.

On the other hand, the multi-projection system according to the first embodiment of the present invention has the plurality of projection surfaces disposed on the front, left and right sides.

Figure 3:
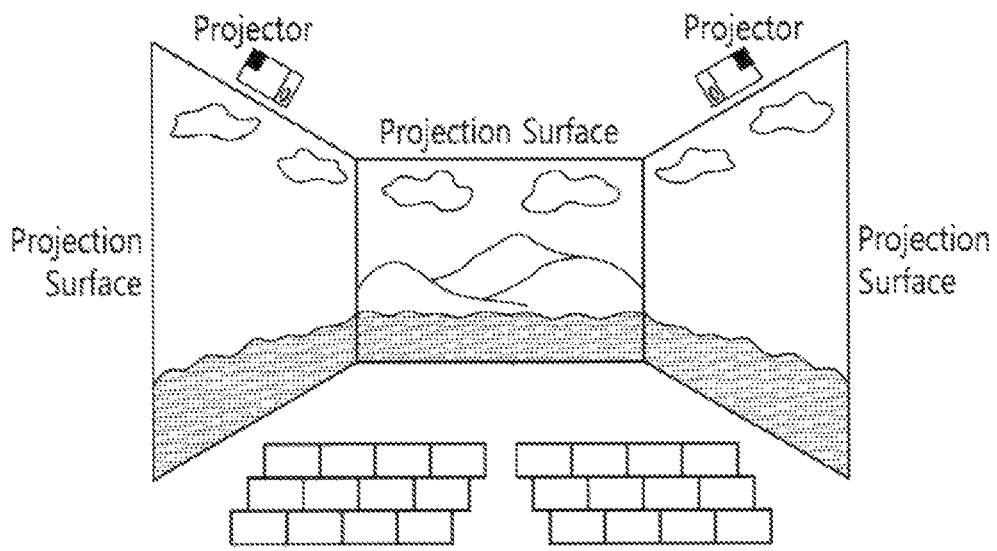
FIG. 3 is a front view showing the multi-projection system according to the first embodiment of the present invention.

FIG. 3 is a front view showing the multi-projection system according to the first embodiment of the present invention. As shown in FIG. 3, the plurality of projection surfaces is disposed on the front, left and right sides, and a projector is disposed on each projection surface to project an image. That is, one or more projectors are provided to project images onto each projection surface, and the images projected onto the projection surfaces through the projectors form one image, thereby increasing the immersion in the images.

The projectors may be disposed on any one side of the theater, and desirably, they are located at opposite positions to the projection surfaces onto which the images are projected therethrough. According to the present invention, the projectors may be disposed on the ceiling of the theater, and mirrors are mounted on the front surfaces of the projectors, so that the angles of the mirrors are adjusted to allow the images to be projected onto the disposed projection surfaces. The way of disposing the projectors is not limited to that described herein, and accordingly, the projectors are disposed in various ways only if the images projected through the projectors are reproduced from the projection surfaces.

Figure 1:
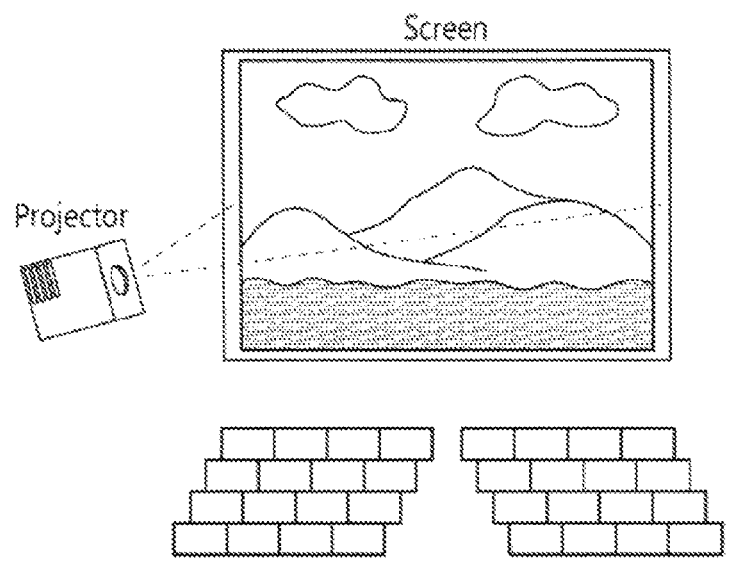
FIG. 1 shows an example of the image reproduced in a conventional theater system.
Figure 1:
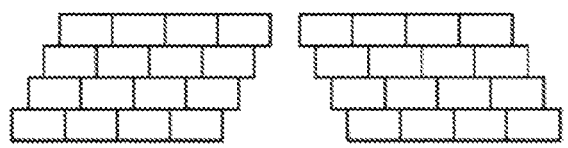

Through the comparison between FIGS. 1 and 3, the features of the present invention will be more clearly described.

The images reproduced from the projection surfaces as shown in FIGS. 1 and 3 have the views wherein characters in the sea see the land. Through the images, the theater customers can recognize their current situation where they are in the sea, while seeing the land.

Referring to FIG. 1, The angles of the theater customers who in the sea seeing the land are fixed to the front. That is, the views of the theater customers are fixed to one point. In case of a reality, however, the land, sea or sky exist in the top, bottom, left and right sides not included in the screen, and further, numerous views exist in accordance with the angles. Since the number of screens on which images are reproduced is one in the conventional technology as shown in FIG. 1, the views of the theater customers are fixed to the two-dimensional plane as one view, so that the reality developed three-dimensionally cannot be well provided.

According to the present invention as shown in FIG. 3, however, various views can be provided. That is, the view is provided to see the land located at the front, the view to see the sea located at the left side, and the view to see the sea located at the right side. Accordingly, the multi-projection system according to the present invention provides the same views as the reality displayed three-dimensionally, thereby making the theater customers feel like they are really in the sea, while seeing the land. When compared with the conventional technology, that is, the present invention provides high three-dimensional effects and immersion.

According to second and third embodiments of the present invention, further, the plurality of projection surfaces is disposed on one or more of top and bottom sides of the theater.

Figure 4:
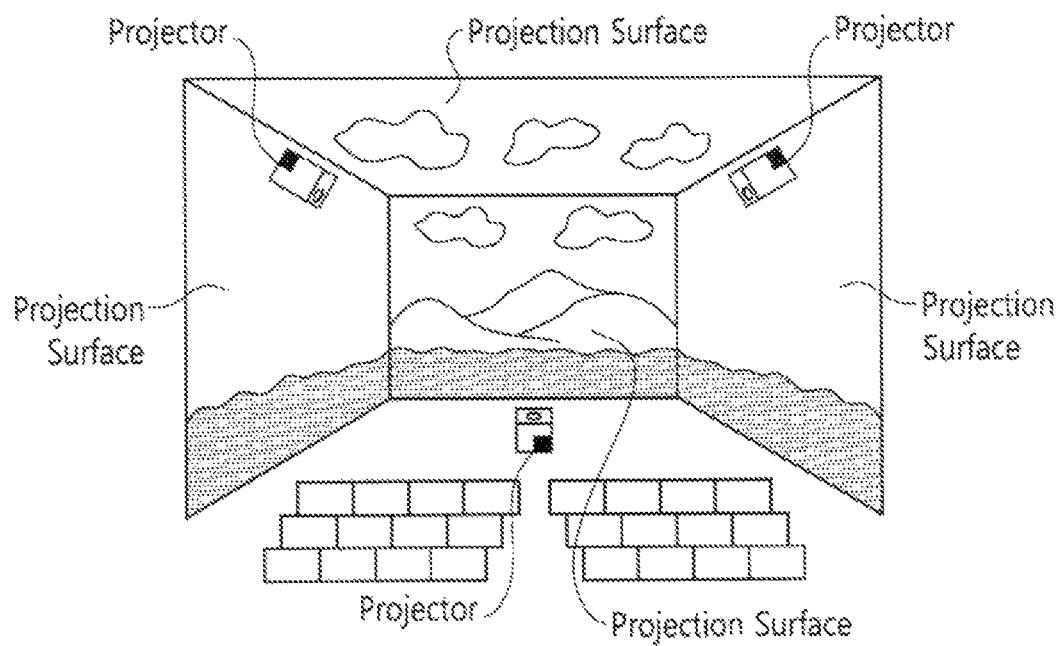
FIG. 4 is a front view showing a multi-projection system according to a second embodiment of the present invention.
Figure 5:
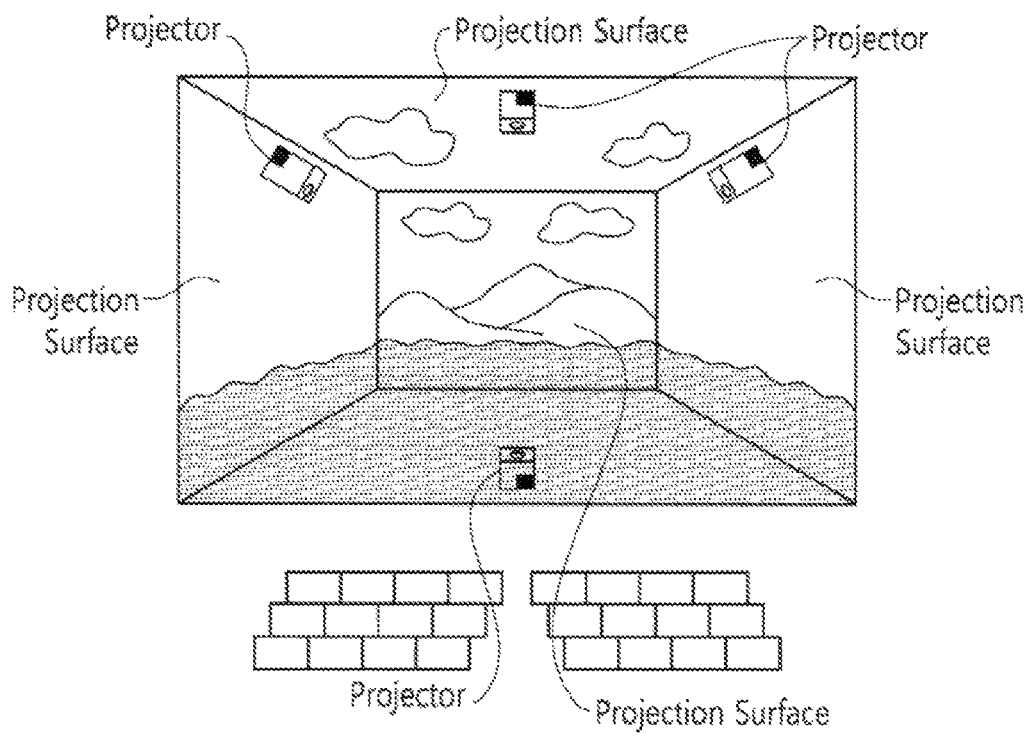
FIG. 5 is a front view showing a multi-projection system according to a third embodiment of the present invention.

The second and third embodiments of the present invention will be clearly appreciated from FIGS. 4 and 5. FIG. 4 shows the projection surfaces disposed on the front, left, right and top sides. When compared with the first embodiment of the present invention as shown in FIG. 3, images can be more additionally reproduced on the top side from the theater customers, so that the real views can be provided in more various manner. According to the second embodiment of the present invention, for example, if it is desired to reproduce the scene where it is raining and windy in the middle of the sea, the scene where the sea waves and it is windy is reproduced from the projection surfaces disposed on the front, left and right sides, and the scene where it is raining is reproduced from the projection surface disposed on the top side, thereby providing substantially live images to the theater customers.

FIG. 5 shows the projection surfaces disposed on the front, left, right, top and bottom sides. When compared with the second embodiment of the present invention as shown in FIG. 4, the projection surface is further disposed on the bottom side. As a result, the images can be reproduced through all of surfaces to which the views of the theater customers are developed. If the projection surfaces are provided as shown in FIG. 5, however, the positions and sizes of the projection surfaces should be adjusted to allow the image on the bottom side to be seen by the theater customers sitting on the rear side seats in consideration of the positions of the seats and the inclination of the arrangement of the seats.

According to the present invention, it is possible that the number of projection surfaces disposed on each side is provided plurally. According to the present invention, as shown in FIG. 5, one projection surface is disposed on each of the front, left, right, top and bottom sides. However, the number of projection surfaces disposed on each side is not limited to one, but is provided plurally. For example, the projection surface disposed on front side is formed of three surfaces in a shape of

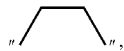

the angle between the projection surface disposed on each of the left and right sides and the projection surface disposed on the front side becomes reduced to allow the images provided on the front, left and right sides to be more gently connected to each other. Of course, the number of projection surface is provided plurally on each of the left, right, top and bottom sides thereof.

Figure 8:
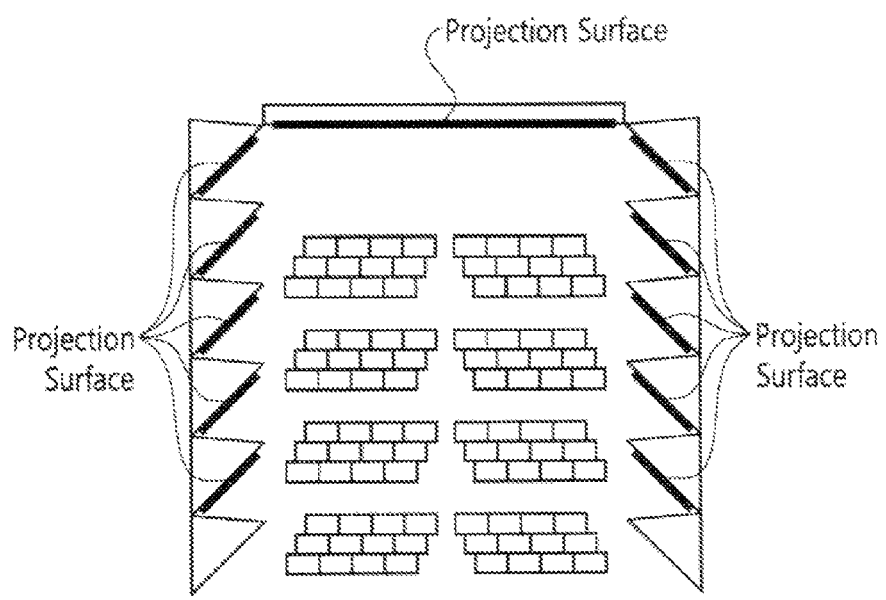
FIG. 8 is a plane view showing a multi-projection system according to a fourth embodiment of the present invention.

FIG. 8 is a plane view showing a multi-projection system according to a fourth embodiment of the present invention, wherein a plurality of projection surfaces are disposed on the left and right sides. The portions with a red color in FIG. 8 indicate the projection surfaces. The fourth embodiment of the present invention as shown in FIG. 8 provides a structure wherein the viewing angles in accordance with the positions of the theater customers can be utilized to the maximum, and in this case, both of the customers sitting on the front side of the theater and the customers sitting on the rear side thereof enjoy the three-dimensional images, without having any limit in their viewing angle. The arrangement of the plurality of projection surfaces on each side is not limited to the embodiment of the present invention, but may be freely variable.

According to the present invention, each projection surface is formed of a wall surface as well as a screen.

In case of conventional theaters, images are projected only onto the screen, but according to the present invention, the projection surfaces from which the images are reproduced are formed of wall surfaces as well as screens. It is not necessary to unify all of the projection surfaces to a specific kind (screen, wall surface, aisle, or ceiling). Desirably, the front projection surface is formed of the screen, and the left and right projection surfaces are formed of the wall surfaces.

If the projection surface is formed of the screen, the screen is made of PVC, white-coated PVC, pearl-coated PVC, or aluminum-coated PVC. The components of the screen are selected in accordance with the size of the theater, the position of the screen, the features of the images reproduced on the screen, and the resolution of the images. When the reflection ratios are considered in accordance with the image projection angles, for example, the screen made of PVC is adequate to relatively small-sized theaters, and contrarily, the screen made of pearl-coated PVC is adequate to relatively large-sized theaters. On the other hand, the screen made of aluminum-coated PVC has more excellent performance in reproducing digitally photographed images and 3D images than the screens made of other components.

On the other hand, there is provided a multi-projection system having display means adapted to reproduce images therefrom, and the display means is disposed on two or more sides not parallel to each other and is formed of an LED or LCD.

In the preferred embodiment of the present invention, the image signals transmitted from a main controller are reproduced through the respective display means, and therefore, even though no separate projectors are provided, it is possible to reproduce the images in the theater. Only if the way of arranging the projection surfaces, the arrangement form, and the way of reproducing images described in the embodiment having the plurality of projection surfaces are performed by means of the display means, they are applied to the multi-projection system of this embodiment in the same manner as above.

In case where the kinds of the plurality of projection surfaces are different from each other and their properties are contrasted with each other, the color tones, textures, and brightness of the images reproduced from the plurality of projection surfaces are different on the plurality of projection surfaces even though the same images as each other are projected onto the projection surfaces, thereby failing to obtain the whole harmony and causing a sense of difference.

In case where the kinds of the plurality of projection surfaces are different from each other, accordingly, the images projected onto the projection surfaces should be corrected in accordance with the kinds thereof.

Since the screen made of the above-mentioned components is in an optimized state of reproducing the images, high-quality images can be provided to the theater customers when the images projected onto the wall surfaces are corrected.

First, colors, materials, and reflection ratios are different in accordance with the kinds of the projection surfaces. Even though the same images are projected, the color tones of the images reproduced are quite different in accordance with the colors of the projection surfaces, and the textures of the images are changed in accordance with the materials of the projection surfaces. Further, the brightness of the images is changed by the difference of the reflection ratios. Accordingly, the images should be corrected in consideration of the features of the projection surfaces.

Figure 6:
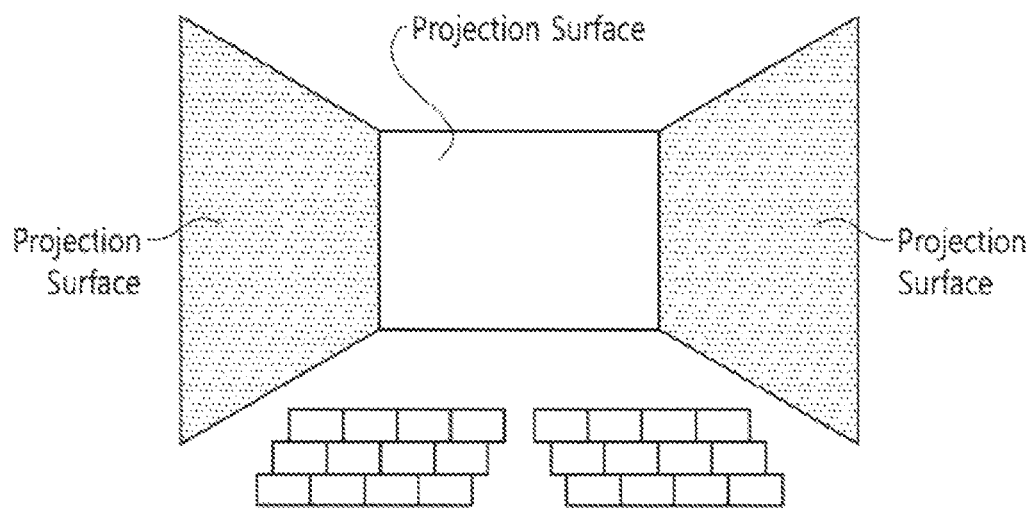
FIGS. 6 and 7 are front views showing the differences caused by the kinds of projection surfaces in the multi-projection system according to the present invention.
Figure 7:
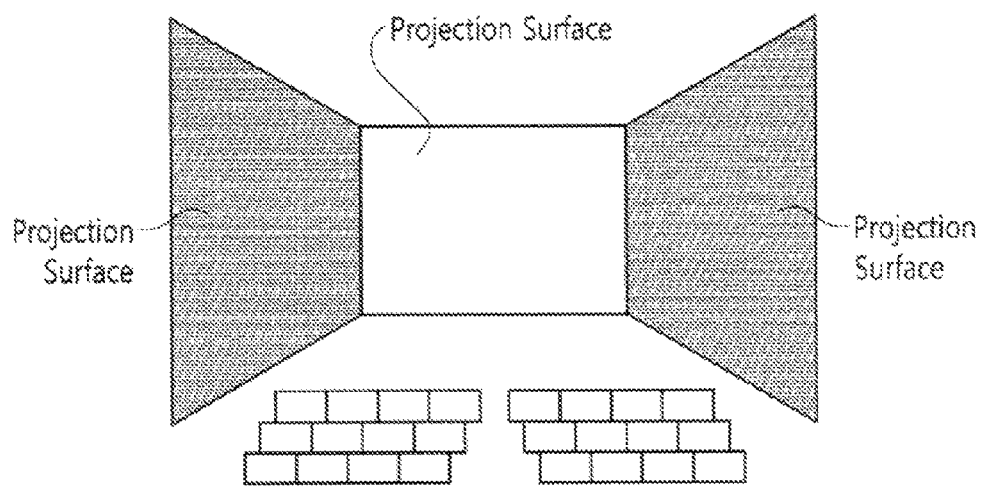

FIGS. 6 and 7 show the multi-projection system where different kinds of projection surfaces are disposed. In the embodiment as shown in FIG. 6, a white screen as the projection surface is disposed on the front, and gray wall surfaces as the projection surfaces are on the left and right sides.

The image projected onto the screen is corrected to have the same color tone, texture and brightness as the images projected onto the wall surfaces, but so as to provide high-quality images, desirably, the images projected onto the wall surfaces are corrected.

The gray wall surfaces make the images projected thereonto reflected darker than the white screen, and therefore, the images projected onto the gray wall surfaces should be corrected appropriately. That is, the images projected onto the gray wall surfaces should be adjusted to increase their brightness by the degree of the brightness lowered by the gray color.

On the other hand, the images projected onto the wall surfaces do not have any regular surfaces when compared with the image onto the screen. The screen has a perfect plane, but the wall surfaces have gentle irregularities in accordance with the materials. Even though the same images are projected, accordingly, the images projected onto the wall surfaces having higher flatness than the screen make the theater customers feel a sense of difference. The images are back-corrected and projected in consideration of the flatness of the wall surfaces, thereby reducing the difference of the images caused by the different kinds of projection surfaces.

According to the present invention, the images are projected onto the different kinds of projection surfaces in consideration of the difference of the reflection ratios caused by the different materials of projection surfaces.

The wall surface has a lower reflection ratio than the screen, and therefore, the images are projected in consideration of the difference of the reflection ratios. For example, when the projection surfaces are disposed as shown in FIG. 6, that is, when the reflection ratio of the wall surface to the screen is 0.5:1, the images projected onto the wall surfaces are projected to have higher brightness by 2 times than that projected onto the screen, so that the difference of the reflection ratios caused by the different materials of projection surfaces is offset to allow the same quality of images to be reproduced from the different kinds of projection surfaces.

According to the present invention, the images are projected in consideration of the shapes of the projection surfaces. If the multi-projection system of the present invention is applied to the theater, the front has a rectangular shape by the image ratio, but the sides are inclined by the arrangement of the seats, so that the shapes of the projection surfaces have various shapes of rectangle, parallelogram, trapezoid, etc., in accordance with the shapes of the theaters.

Accordingly, the images should be projected in consideration of the shapes of the projection surfaces. That is, if the image is corrected for the projection onto the projection surface having the shape of parallelogram, a portion of the image is not provided on the projection surface having the shape of trapezoid when projected onto the projection surface having the shape of trapezoid, and contrarily, the image is not projected onto a portion of the projection surface. Accordingly, the images are corrected in accordance with the shapes of the projection surfaces.

On the other hand, the images within one projection surface are differently provided to the theater customers in accordance with the distance between the projection surface and the projector for projecting the image onto the projection surface.

Since the projector is a kind of point source, only if the projection surface is not curved, the distances between the projector and the points on the projection surface are different. If the projector is disposed on the front of the center of the projection surface, the vertexes of the projection surface have longer distances than the center of the projection surface from the projector. Since the intensity of light is inversely proportional to the square of the distance, even though the images are projected from one projector, the intensities of the images are different by the different distances between the projector and each point of the projection surface, so that even if the same colors are provided, the longer the distance between the projection surface and the projector is, the lighter the colors of the images are and the lower the vividness of the images is.

Furthermore, in case where the projector projecting the image onto the projection surface is not located at the center of the projection surface, the image projected from the projector is slantly incident on the projection surface. As a result, the image ratios are different by point within the projection surface to cause the objects having the same size in the image to be displayed to different sizes.

According to the present invention, accordingly, the images are corrected in consideration of the installation position of the projector, the distance between the projector and each point of the projection surface, and the image projection angle.

In addition to the above-mentioned variables, the images are corrected in consideration of a lot of variables occurring in the different kinds of projection surfaces.

On the other hand, the correction of the images may be achieved by the projectors or a main controller controlling the projectors. According to the present invention, the images are corrected by means of the projectors in consideration of the kinds of the projection surfaces, or the images are projected and corrected by means of the combination of the plurality of projectors on one projection surface. Alternatively, the images projected onto the projection surfaces are corrected by means of the main controller in consideration of the kinds of the projection surfaces, and the corrected images are transmitted to the respective projectors, so that the corrected images are reproduced from the projection surfaces. Of course, the correction of the images may be performed by means of both of the main controller and the projectors in accordance with the image correction ways (for example, the correction of the images according to the colors of the projection surfaces, the correction of the images according to the materials of the projection surfaces, and the correction of the images according to the reflection ratios of the projection surfaces).

FIG. 7 shows the example where the wall surface having the different features from that as shown in FIG. 6 is utilized as the projection surface. The correction of the images according to the features of the projection surface is similar to that explained on FIG. 6.

According to the present invention, on the other hand, in case where the projection surface is formed of the wall surface, the wall surface has a sound-absorbing material formed thereon.

In case where the multi-projection system of the present invention is applied to a multiplex type theater having a plurality of theaters adjacent to each other, if different kinds of movies are reproduced in the adjacent theaters, the reproduced sound should not interfere with each other. That is, the theater customers in a first theater should not hear the sound generated from a second theater.

The wall surface as the projection surface serves to reproduce the images as well as to effectively protect the sound generated from the theater. Accordingly, the wall surface adopted in the present invention has the sound-absorbing material formed thereon.

An example of the sound-absorbing material includes a porous sound-absorbing material. The porous sound-absorbing material absorbs the sound energy to a form of thermal energy through the friction of the internal components thereof with sounds or the viscosity resistance when the sound is transmitted to the air into tiny gaps. The transmission of the sound generated in one theater to another theater is prevented.

Another example of the sound-absorbing material includes a vibrating plate sound-absorbing material. Air space is formed on the back of the sound-absorbing material of the wall surface and serves as a kind of damper, thereby absorbing the sound energy. Especially, the vibrating plate sound-absorbing material has an excellent ability to absorb low frequency sound.

Yet another example of the sound-absorbing material includes a resonant sound-absorbing material. In this case, the air pressure difference between the interior of the resonant sound-absorbing material and the theater is used, so that the sound energy is diminished by using the frictional heat generated by the vibration of the air in the sound-absorbing material around resonant frequency.

The above-mentioned sound-absorbing materials may be used alone as well as combined with each other. That is, both of the porous sound-absorbing material and the vibrating plate sound-absorbing material may be applied.

On the other hand, according to the present invention, optical paint for light reflection may be applied to the wall surface or the wall surface on which the sound-absorbing material is provided, that is, the surface onto which the image is projected. The application of the optical paint enables the quality of the image on the projection surfaces, especially the wall surface to be improved.

As set forth in the foregoing, the multi-projection system according to the present invention is capable of reproducing the images through the plurality of projection surfaces disposed three-dimensionally, thereby providing high three-dimensional effects and high immersion to the theater customers.

Further, the multi-projection system according to the present invention is capable of providing multi-view images, thereby making the theater customers feel like they really exist in the space described through the images.

Additionally, the multi-projection system according to the present invention is capable of reproducing the images through the different kinds of projection surfaces in consideration of the differences caused by the kinds of projection surfaces, thereby providing the images having the same quality, irrespective of the kinds of the projection surfaces.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A multi-projection system, comprising:
a plurality of projectors for projecting images onto a plurality of projection surfaces, wherein at least some of the projection surfaces are not parallel to each other,
wherein the projection surfaces are composed of at least a screen surface in a theater and at least one other surface in the theater which is made of a different material from the screen surface,
wherein images projected onto said at least one other surface are corrected based on properties of the material of said other surface to create images that are more harmonious with those images being projected on the screen surface, and
wherein images projected onto said at least one other surface are complimentary images to those images being projected onto the screen surface so as to create a total image which provides three-dimensional effects by projecting different images onto the plurality of projection surfaces.

2. The multi-projection system according to claim 1, wherein the images projected onto the projection surfaces are sub-images which are divided from one image.

3. The multi-projection system according to claim 1, wherein a main image is reproduced on one of the projection surfaces disposed at a front side while images with special effects are being reproduced on remaining ones of the projection surfaces disposed at lateral sides.

4. The multi-projection system according to claim 1, wherein the correction is performed in accordance with reflection ratio of the projection surfaces.

5. The multi-projection system according to claim 1, wherein one projector is provided for each projection surface.

6. The multi-projection system according to claim 1, wherein the number of projection surfaces disposed on certain side is provided plurally.

7. The multi-projection system according to claim 1, wherein the screen is made of PVC, white-coated PVC, pearl-coated PVC, or aluminum-coated PVC.

8. The multi-projection system according to claim 1, wherein the correction is performed in accordance with the colors of the projection surfaces.

9. The multi-projection system according to claim 1, wherein the correction is performed in accordance with the materials of the projection surfaces.

10. The multi-projection system according to claim 1, wherein the correction is performed in accordance with the shapes of the projection surfaces.

11. The multi-projection system according to claim 1, wherein the correction is performed in accordance with the distances between the projection surfaces and the projectors caused by the positions of the projectors or in accordance with the image projection angles.

12. The multi-projection system according to claim 1, wherein each wall surface comprises a sound-absorbing material.

13. The multi-projection system according to claim 12, wherein the sound-absorbing material comprises any one of a porous sound-absorbing material, a vibrating plate sound-absorbing material, and a resonant sound-absorbing material.

14. The multi-projection system according to claim 1, wherein each wall surface is coated with optical paint for light reflection.

15. The multi-projection system according to claim 1, wherein the total image provides three-dimensional effects without use of a stereoscopic projection system.

* * * * *